United States Patent
Pastre et al.

(10) Patent No.: US 11,887,492 B2
(45) Date of Patent: Jan. 30, 2024

(54) METHOD AND SYSTEM FOR COMPUTING A TRAJECTORY FOR LANDING AN AIRCRAFT

(71) Applicant: Airbus Operations SAS, Toulouse (FR)

(72) Inventors: Thomas Pastre, Toulouse (FR); Miguel Consiglieri Pedroso Mendes Dias, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 120 days.

(21) Appl. No.: 17/699,323

(22) Filed: Mar. 21, 2022

(65) Prior Publication Data

US 2022/0309933 A1  Sep. 29, 2022

(30) Foreign Application Priority Data

Mar. 23, 2021 (FR) ...................................... 2102914

(51) Int. Cl.
| | |
|---|---|
| G08G 5/02 | (2006.01) |
| G05D 1/10 | (2006.01) |
| B64D 45/04 | (2006.01) |
| G08G 5/00 | (2006.01) |

(52) U.S. Cl.
CPC ............. *G08G 5/025* (2013.01); *B64D 45/04* (2013.01); *G05D 1/1062* (2019.05); *G08G 5/0047* (2013.01)

(58) Field of Classification Search
CPC ...... G08G 5/025; G08G 5/0047; B64D 45/04; G05D 1/1062

USPC ............................................................. 701/3
See application file for complete search history.

(56) References Cited

U.S. PATENT DOCUMENTS

| | | | |
|---|---|---|---|
| 2015/0317905 A1* | 11/2015 | Bourret | G01C 5/06 |
| | | | 701/4 |
| 2017/0132942 A1 | 5/2017 | Mere | |
| 2018/0107227 A1* | 4/2018 | Sharma | B64D 45/04 |
| 2020/0273350 A1 | 8/2020 | Litvova et al. | |

OTHER PUBLICATIONS

French Search Report; priority document.
(Continued)

*Primary Examiner* — Isaac G Smith
(74) *Attorney, Agent, or Firm* — Greer, Burns & Crain, Ltd.

(57) ABSTRACT

To bring an aircraft in flight to a runway, an automatic trajectory generation system obtains a procedure, called STARI procedure, which provides a final trajectory flyable by the aircraft to land on the runway, such that from the entry point of the final trajectory or from any point above it, a holding loop pattern of a predefined shape is flyable in order to dissipate energy if necessary. The automatic trajectory generation system then computes a lateral trajectory, avoiding any terrain relief, meteorological obstacles and military zones, between the current position of the aircraft and the entry point or a point above it, based on performance adapted to an operational state of the aircraft. An overall trajectory is thus obtained, by linking the computed lateral trajectory and the final trajectory of the STARI procedure, including iterations of the holding loop pattern if necessary.

13 Claims, 14 Drawing Sheets

(56) References Cited

OTHER PUBLICATIONS

A. Fallast et al., "Automated Trajectory Generation and Airport Selection for an Emergency Landing Procedure of a CS23 Aircraft" University of Applied Sciences, Graz, Austria, Jun. 30, 2017; pp. 481-492.

* cited by examiner

METHOD AND SYSTEM FOR COMPUTING A TRAJECTORY FOR LANDING AN AIRCRAFT

CROSS-REFERENCES TO RELATED APPLICATIONS

This application claims the benefit of the French patent application No. 2102914 filed on Mar. 23, 2021, the entire disclosures of which are incorporated herein by way of reference.

FIELD OF THE INVENTION

The present invention relates to a system for computing, automatically and in real time, a trajectory to be followed to land an aircraft, from a current in-flight geographical position and altitude, on a georeferenced runway.

BACKGROUND OF THE INVENTION

When an aircraft is in flight, it may be desirable to provide automatic assistance in order to automatically determine a trajectory that makes it possible to bring the aircraft to a runway. For example, this assistance would be particularly useful if the aircraft has just one pilot, and particularly advantageous when this pilot is incapable of determining this trajectory himself Many obstacles have to be taken into account when determining a trajectory that is flyable: the relief of the terrain, meteorological obstacles, military no-fly zones, the operational state of the aircraft (cabin depressurization, engine offline, etc.). A flyable trajectory is a trajectory that has, at all points, a minimum (or predetermined) distance margin with respect to any identified obstacle (relief, etc.) and that the aircraft is able to follow, given its state of health (potential depressurization, loss of an engine, etc.).

In the current state of the art, determining such a trajectory automatically and in real time requires a large amount of computing resources, and especially a significant computing time. It is then desirable to mitigate these drawbacks of the prior art.

It is in particular desirable to provide a solution that makes it possible to determine a safe trajectory to be followed in order to land an aircraft that is currently in flight, from its current geographical position and altitude, on a georeferenced runway. It is more particularly desirable to provide a solution that makes it possible to determine this trajectory in a reduced time. It is also desirable to provide a solution that makes it possible to inform the pilot whether such a trajectory exists. It is also desirable to provide a solution that makes it possible to inform the pilot of the runways, from a list of georeferenced runways, for which such a trajectory exists.

SUMMARY OF THE INVENTION

One aim of the present invention is to propose a trajectory generation method for generating a trajectory for bringing an aircraft in flight from a current position to a georeferenced runway, the method being implemented by an automatic trajectory generation system in the form of electronic circuitry on board the aircraft, the method comprising the following successive steps: obtaining a procedure, called STARI procedure, which is suited to this georeferenced runway and which provides a final trajectory for the approach to this runway that is flyable by the aircraft in order to land, regardless of the performance of the aircraft, and such that, from the entry point of the final trajectory or any point above it, a holding loop pattern of a predefined shape is flyable in order to dissipate energy if necessary; computing a lateral trajectory, avoiding any terrain relief, meteorological obstacles and military no-fly zones, between the current position of the aircraft and the entry point or a point above it, based on performance adapted to an operational state of the aircraft; providing an overall trajectory in order to bring the aircraft to landing on this runway, by linking the computed lateral trajectory and the final trajectory provided by the STARI procedure, including one or more iterations of the holding loop pattern if necessary. Thus, performing the trajectory determination by first obtaining the STARI procedure and then by computing the lateral trajectory considerably reduces the complexity of computing a trajectory, and therefore also the computing time required to determine a safe, flyable trajectory.

According to one particular embodiment, the method comprises the following steps, in order to obtain the STARI procedure: when a STARI procedure has been defined beforehand for the runway and has been stored in a database, reading the STARI procedure from the database; and when the database does not store any STARI procedure for the runway, establishing the STARI procedure in real time. The STARI procedure is established in real time as follows: constructing a final approach trajectory; and searching for an appropriate entry point of the STARI procedure. The sought entry point of the STARI procedure complies with the following conditions: a flyable trajectory to an entry point of the constructed final approach trajectory exists; the holding loop pattern is safely flyable by the aircraft from the entry point of the STARI procedure in order to dissipate energy.

According to one particular embodiment, the method comprises the following steps, in order to search for the appropriate entry point of the STARI procedure: evaluating whether it is safe to implement the holding loop pattern, based on information about the elevation of the terrain surrounding the runway, by placing the entry point of the STARI procedure on the entry point of the final approach trajectory and by aligning the holding loop pattern with the final approach trajectory; considering the entry point of the STARI procedure to be appropriate when it is safe to implement the holding loop pattern in light of the information about the elevation of the terrain surrounding the runway; and performing a backward search for an entry point of the STARI procedure, from the entry point of the final approach trajectory by applying a descent slope, when it is not safe to implement the holding loop pattern in light of the information about the elevation of the terrain surrounding the runway.

According to one particular embodiment, the backward search comprises the following steps: exploring, in trajectory sections of a predefined length, paths formed of a sequence of turns and/or straight segments, considering a descent slope, a turn radius and a speed of the aircraft in line with the operational state of the aircraft; evaluating whether it is safe to implement the holding loop pattern, based on the information about the elevation of the terrain surrounding the runway, by placing the entry point of the STARI procedure on the end of the explored path; considering the entry point of the STARI procedure to be appropriate when it is safe to implement the holding loop pattern in light of the information about the elevation of the terrain surrounding the runway, and establishing a joining trajectory between the appropriate entry point of the STARI procedure and the entry of the final approach procedure; and extending the explored paths with new sections and re-evaluating the implementation of the holding loop pattern when it is not safe to implement the holding loop pattern in light of the information about the elevation of the terrain surrounding the runway.

According to one particular embodiment, the holding loop pattern has a predetermined oblong shape characterized by a radius r, which is the radius of the two semicircles at the ends, and a distance d, which is the distance between the two semicircles, and wherein the radius r is defined based on the performance adapted to the operational state of the aircraft and increases with altitude.

According to one particular embodiment, the method comprises the following steps, before computing the lateral trajectory: determining a maximum altitude with regard to the performance adapted to the operational state of the aircraft; determining a vertical trajectory profile that brings the aircraft to the maximum altitude. In addition, the lateral trajectory is computed while following the determined vertical trajectory profile.

According to one particular embodiment, the vertical trajectory profile is optimized in order to reduce a number of implementations of the predetermined holding loop pattern able to be applied to the STARI procedure, through the following steps: obtaining a terrain elevation profile along the lateral trajectory; determining a top of descent and a corresponding descent trajectory to the entry point of the STARI procedure; incrementing, if necessary, the number of implementations of the holding loop pattern by one unit until the obtained descent trajectory is flyable.

According to one particular embodiment, if the top of descent occurs before a top of climb when the aircraft is climbing to attempt to reach the maximum altitude, the vertical trajectory profile is adjusted so that the aircraft performs a transition between the climbing phase and the descent phase at the intersect of the climb and descent slopes.

Also proposed is a computer program comprising instructions for implementing the method outlined above according to any one of its embodiments when the instructions are executed by a processor. Also proposed is an information storage medium storing instructions for implementing the method outlined above according to any one of its embodiments when the instructions are read from the information storage medium and executed by a processor.

Also proposed is an automatic trajectory generation system for bringing an aircraft in flight from a current position to a georeferenced runway, the system comprising electronic circuitry configured so as to implement the following steps: obtaining a procedure, called STARI procedure, which is suited to the georeferenced runway and which provides a final trajectory for the approach to the runway that is flyable by the aircraft in order to land, regardless of the performance of the aircraft, and such that, from the entry point of the final trajectory or any point above it, a holding loop pattern of a predefined shape is flyable in order to dissipate energy if necessary; computing a lateral trajectory, avoiding any terrain relief, meteorological obstacles and military no-fly zones, between the current position of the aircraft and the entry point or a point above it, based on performance adapted to an operational state of the aircraft; providing an overall trajectory in order to bring the aircraft to landing on the runway, by linking the computed lateral trajectory and the final trajectory provided by the STARI procedure, including one or more iterations of the holding loop pattern if necessary.

Also proposed are avionics incorporating an automatic trajectory generation system outlined above.

According to one particular embodiment, the avionics comprise electronic circuitry configured so as to: select a georeferenced runway; order the automatic trajectory generation system to generate a flyable trajectory for reaching the georeferenced runway; if the automatic trajectory generation system is incapable of generating such a trajectory, select another georeferenced runway until finding a runway for which the automatic trajectory generation system manages to generate such a trajectory.

According to one particular embodiment, the electronic circuitry of the avionics is configured so as to program an autopilot in accordance with a flyable trajectory that is provided by the automatic trajectory generation system.

Also proposed is an aircraft comprising the avionics outlined above in any one of its embodiments.

BRIEF DESCRIPTION OF THE DRAWINGS

The features of the invention mentioned above, along with others, will become more clearly apparent on reading the following description of at least one exemplary embodiment, the description being given with reference to the appended drawings, in which.

DETAILED DESCRIPTION OF THE PREFERRED EMBODIMENTS

Figure 1:
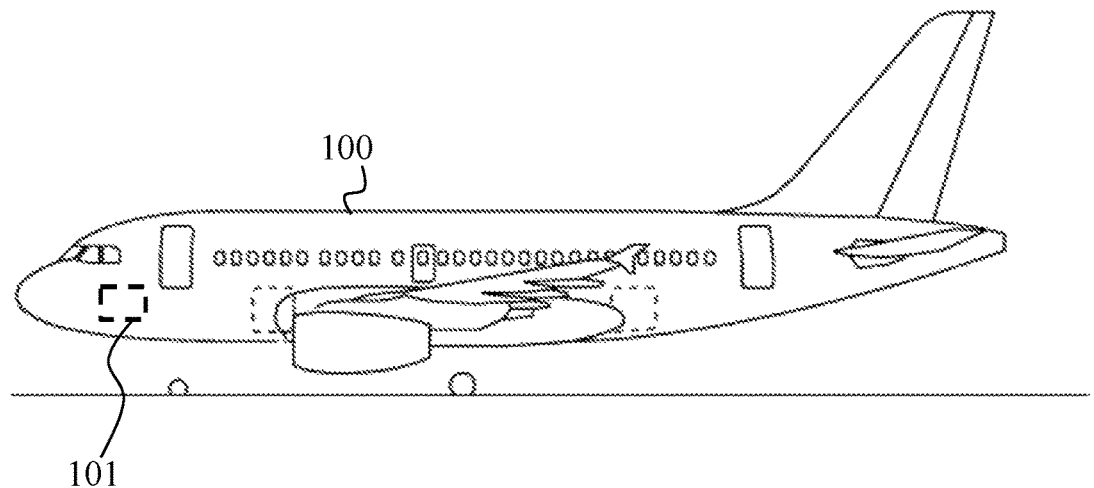
FIG. 1 schematically illustrates a side view of an aircraft equipped with an automatic trajectory generation system.

FIG. 1 schematically illustrates a side view of an aircraft 100 equipped with an automatic trajectory generation ATG ("automatic trajectory generator") system 101.

The ATG system 101 is an item of on-board electronic equipment. For example, the ATG system 101 forms part of electronic circuitry of the avionics of the aircraft 100. Preferably, the ATG system 101 is integrated into a computer of the aircraft, for example the flight management system FMS of the aircraft 100, or another trajectory computing system separate from the flight management system FMS.

The ATG system 101 is a piloting assistance system for determining, in real time, a safe, flyable trajectory to be followed to land the aircraft 100 when it is in flight, from its current geographic position and altitude, on a georeferenced runway.

The term "runway" should be understood in the broad sense, that is to say, the runway may be a standard airport runway, but may also be a splashdown zone or an aircraft carrier.

Figure 2:
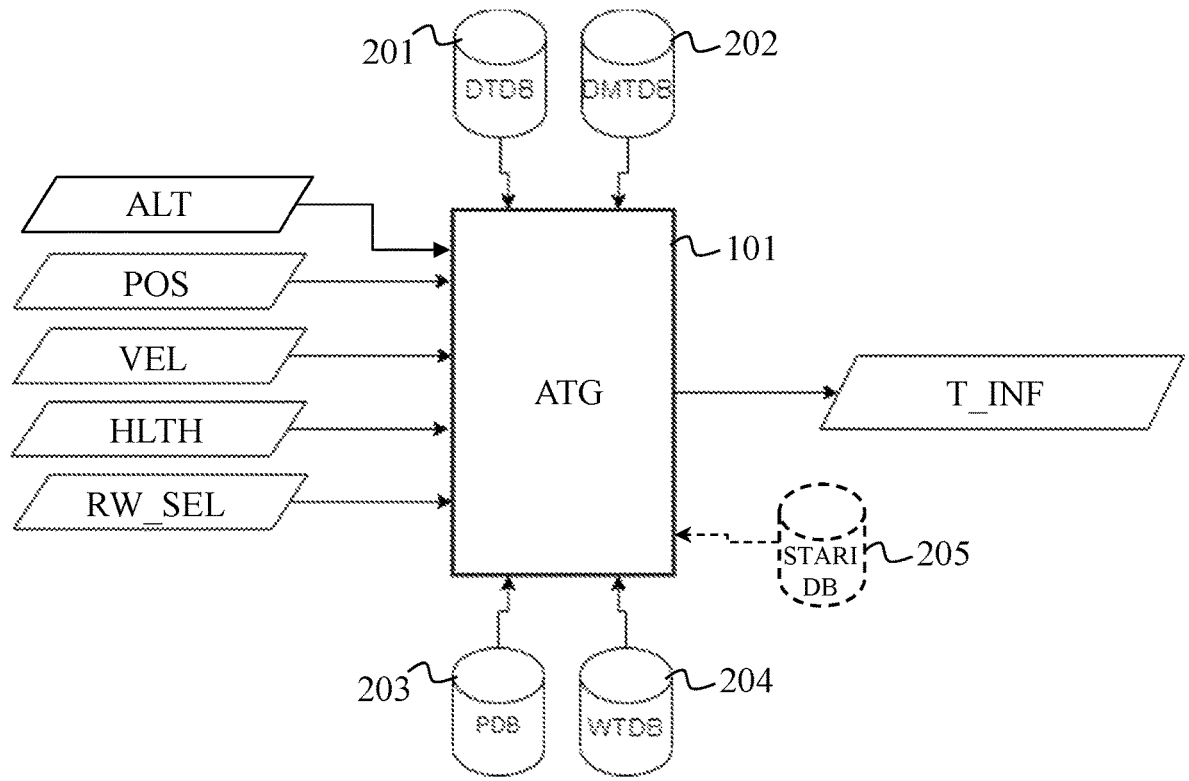
FIG. 2 schematically illustrates the automatic trajectory generation system.

The ATG system 101 is illustrated schematically in FIG. 2. The ATG system 101 is configured so as to take a set of information provided by the avionics at input: the current altitude of the aircraft 100 (denoted ALT), the current geographical position of the aircraft 100 (denoted POS), the current velocity or speed of the aircraft 100 (denoted VEL), information about the health of the aircraft 100 (denoted HLTH) and selected runway information (denoted RW_SEL). The ATG system 101 is configured so as to provide trajectory information (denoted T_INF) at output.

The health information HLTH is an item of information, such as a set of indicators, that represents an operational state of the aircraft 100. In particular, the health information HLTH indicates whether or not the cabin is depressurized, whether or not all of the engines are operational, etc. The health information HLTH thus indicates whether any trajectory constraints are to be complied with, such as for example a reduced maximum flying altitude ALTmax in the event of cabin depressurization, or reduced performance in the event of an operating fault with an engine.

It will be recalled here that a flyable trajectory is a trajectory that has, at all points, a minimum (or predetermined) distance margin with respect to any identified obstacle (relief, etc.) and that the aircraft 100 is able to follow, given its state of health (potential depressurization, loss of an engine, etc.) as indicated by the health information HLTH.

In order to determine the trajectory information T_INF, the ATG system 101 possesses information provided by a set of databases. More particularly: a database DTDB (for "Digital Terrain DataBase") 201, which provides terrain elevation information, a database DMTDB (for "Digital Military Terrain DataBase") 202, which provides georeferencing information for military no-fly zones; a database WTDB (for "Weather Terrain DataBase") 204, which provides georeferenced information for zones to be avoided due to weather conditions; and a database PDB (for "Performance DataBase") 203, which provides performance information for the aircraft 100 based on the operational state of the aircraft 100.

In one particular embodiment, the ATG system 101 furthermore possesses information provided by a database STARI DB ("Standard Terminal Arrival Route Incapacitation DataBase") 205. The database STARI DB 205 provides STARI procedures that have been established beforehand for one or more georeferenced runways, as described below.

A STARI procedure is a procedure that provides a final trajectory for the approach to the runway under consideration, which is flyable by the aircraft 100 in order to land, regardless of the performance of the aircraft 100, and such that, from its entry point or any point above it, a flyable holding pattern of a predefined shape is flyable in order to dissipate energy if necessary. In this sense, a STARI procedure is a special type, introduced here, of STAR ("Standard Terminal Arrival Route") procedure, which defines, in a standard manner, a trajectory to be followed to arrival at an airport by an aircraft travelling in accordance with instrument flight rules IFR.

The abovementioned databases may be fully integrated into a computer system of the aircraft 100. Before takeoff, the databases are updated, for example using an electronic flight bag EFB. The databases may be integrated into a ground-based computer system, for example a data center of an airline for which the aircraft 100 operates. The databases are then updated through air-to-ground communications AGC. These two approaches may be combined, with preloading of the databases before takeoff and updates in flight, for example in order to take into account data evolutions in real time (weather conditions, etc.).

Figure 3:
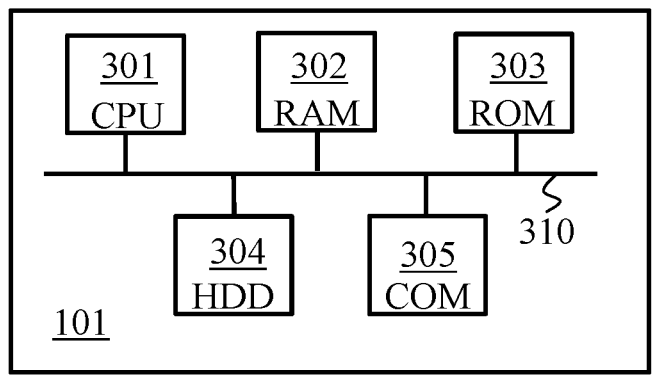
FIG. 3 schematically illustrates one example of the hardware architecture of the automatic trajectory generation system.

FIG. 3 schematically illustrates one example of the hardware architecture of the ATG system 101, which then comprises the following, connected by a communication bus 300: a processor or CPU ("central processing unit") 301; a random access memory RAM 302; a read-only memory ROM 303, for example a flash memory; a data storage device, such as an HDD ("hard disk drive"), or a storage medium reader, such as an SD ("Secure Digital") card reader 304; at least one communication interface 305 allowing the ATG system 101 to interact with the avionics of the aircraft 100.

The processor 301 is capable of executing instructions loaded into the RAM 302 from the ROM 303, from an external memory (not shown), from a storage medium, such as an SD card, or from a communication network (not shown). When the ATG system 101 is powered up, the processor 301 is capable of reading instructions from the RAM 302 and of executing them. These instructions form a computer program that causes the processor 301 to implement the behaviors, steps and algorithms described here.

All or some of the behaviors, steps and algorithms described here may thus be implemented in software form by executing a set of instructions by way of a programmable machine, such as a DSP ("digital signal processor") or a microcontroller, or be implemented in hardware form by way of a machine or a dedicated component ("chip") or a dedicated set of components ("chipset"), such as an FPGA ("field-programmable gate array") or an ASIC ("application-specific integrated circuit"). Generally speaking, the ATG system 101 comprises electronic circuitry designed and configured so as to implement the behaviors, steps and algorithms described here.

Figure 4:
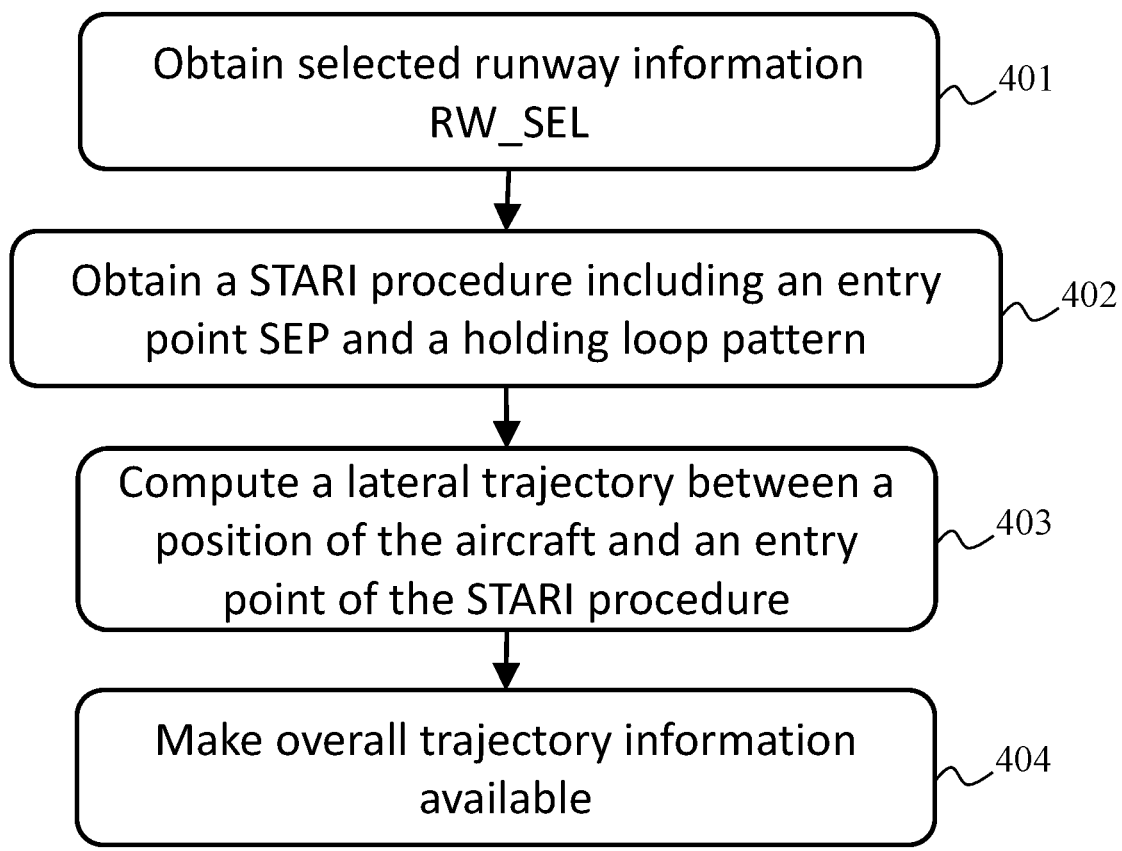
FIG. 4 schematically illustrates a trajectory generation algorithm implemented by the automatic trajectory generation system.

FIG. 4 schematically illustrates a trajectory generation algorithm implemented by the ATG system 101.

In a step 401, the ATG system 101 obtains the selected runway information RW_SEL. For example, the runway in question is selected by the avionics from among a predetermined list of runways. The selected runway information RW_SEL includes a georeference of the runway in question, along with additional information as described below with reference to FIG. 7.

In a step 402, the ATG system 101 obtains a STARI procedure suited to the selected runway. The STARI procedure defines an entry point SEP ("STARI Entry Point") of the STARI procedure, along with a holding loop pattern able to be applied in complete safety by the aircraft 100. This aspect is described below.

In a first embodiment, the STARI procedure is computed in real time by the ATG system 101. In a second embodiment, the STARI procedure is retrieved by the ATG system 101 from the database STARI DB 205. One particular embodiment is described below with reference to FIG. 5.

In a step 403, the ATG system 101 computes a lateral trajectory between the current position POS of the aircraft 100 and the entry point SEP ("STARI Entry Point") of the STARI procedure obtained in step 402. The computation of the trajectory avoids the terrain relief defined by the terrain elevation information from the database DTDB 201, along with the military zones defined by the database DMTDB 202, and the weather obstacles as defined by the database WTDB 204. With regard to the zones to be avoided due to weather conditions and the military zones, these may be defined as terrain elevation information with a lower bound and an upper bound. For example, the military zones have a lower bound of zero and an upper bound representative of a very high altitude, or even an infinite altitude. Storm clouds may thus also be defined so as to make it possible to pass below them. The trajectory is furthermore computed taking into account the performance of the aircraft 100 as provided by the database PDB 203 (ability to change heading, etc.) and the velocity VEL.

The lateral trajectory is preferably computed, as described below, in accordance with a vertical trajectory profile that aims to bring the aircraft 100 to a maximum cruising altitude ALTmax. The ATG system 101 defines the altitude ALTmax based on the health information HLTH.

In a step 404, the ATG system 101 provides overall trajectory information T_INF for reaching the selected runway. To this end, the ATG system 101 obtains the overall trajectory by linking the lateral trajectory computed in step 403 and the STARI procedure obtained in step 402. When the lateral trajectory computed in step 403 leads above the entry point SEP of the STARI procedure, one or more iterations of the holding loop pattern are inserted in order to link the lateral trajectory computed in step 403 and the STARI procedure obtained in step 402, thus allowing the aircraft 100 to reduce its altitude in complete safety. The number of iterations of the holding loop pattern that are required depends on the performance of the aircraft 100 and on the altitude difference to be compensated for.

According to one embodiment, the overall trajectory information T_INF is a graphical depiction of the trajectory in question on a screen in the cockpit of the aircraft 100. According to another embodiment, the overall trajectory information T_INF is a description of the trajectory in question able to be interpreted by an autopilot of the avionics of the aircraft 100. In this case, the autopilot is programmed with the trajectory in question in order to bring the aircraft 100 to the runway. According to another embodiment, the overall trajectory information T_INF is a description of the trajectory in question transmitted in the form of signals to an air traffic control (ATC) service.

Figure 16:
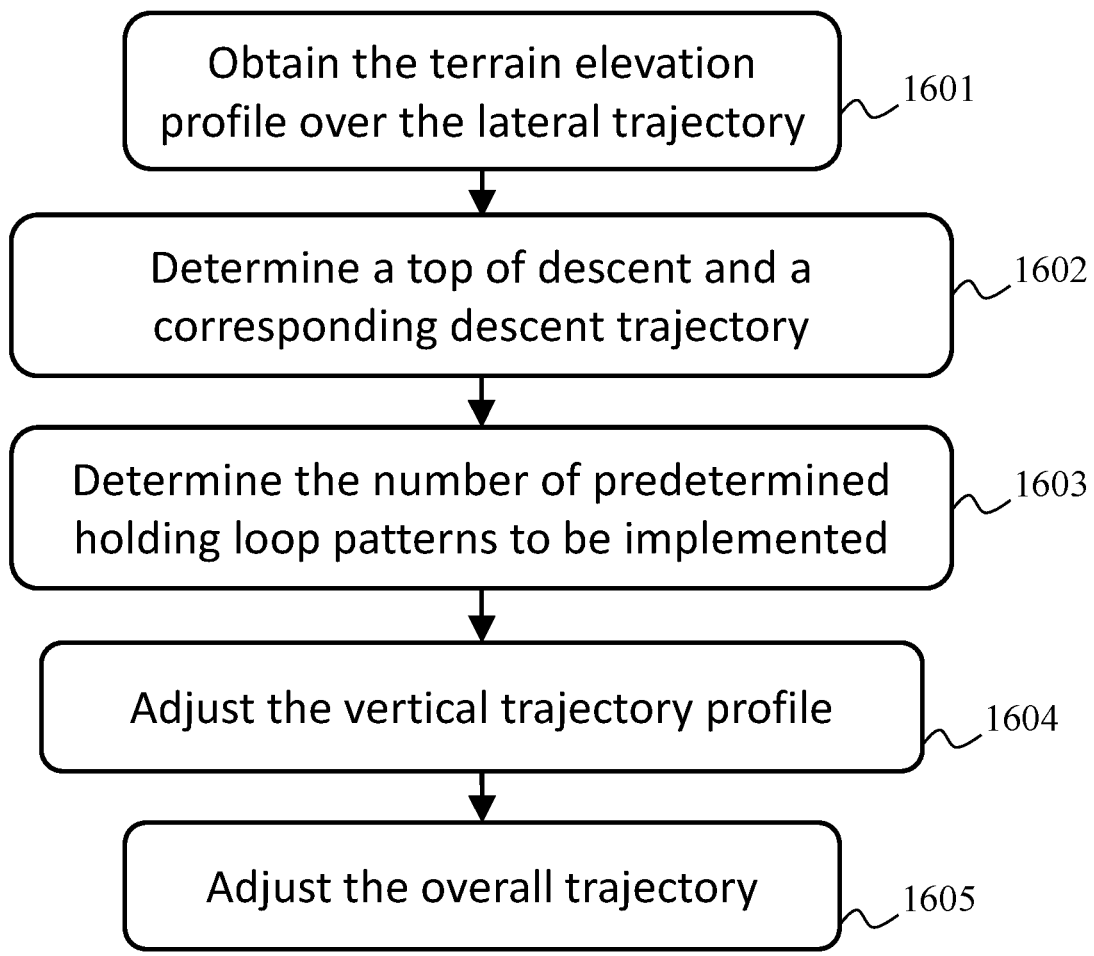
FIG. 16 schematically illustrates a vertical trajectory profile optimization algorithm implemented by the automatic trajectory generation system.

As described below with reference to FIGS. 13 and 14A to 14D, a vertical trajectory profile is preferably computed by the ATG system 101 so as to allow the aircraft 100 to reach the maximum altitude ALTmax if necessary. Furthermore, following step 403, the ATG system 101 preferably optimizes the vertical trajectory profile between the current position POS of the aircraft 100 and the entry point SEP of the STARI procedure, so as to minimize the number of iterations of the holding loop pattern that are required. This aspect is described below with reference to FIG. 16.

By starting by defining the STARI procedure able to be applied to determine the flyable trajectory to be followed from the current position of the aircraft 100, it is then up to the ATG system 101 to compute a lateral trajectory to the maximum altitude ALTmax to reach the entry point, or a point above it, of the STARI procedure. This division of the determination of a trajectory considerably reduces the complexity of computing a trajectory, and therefore the computing time required to determine a safe, flyable trajectory. From another viewpoint, with identical computing time, the proposed approach makes it possible to reduce the amount of processing resources required to determine a safe trajectory to reach the targeted runway.

Another advantage is the ability to predict the way in which the aircraft 100 is able to dissipate energy if necessary, by virtue of implementing the holding loop pattern which results from the STARI procedure. Yet another advantage is the ability to predict the final approach itinerary of the aircraft. This predictability is an undeniable advantage for air traffic control ATC and for any other aircraft in the nearby airspace.

Figure 5:
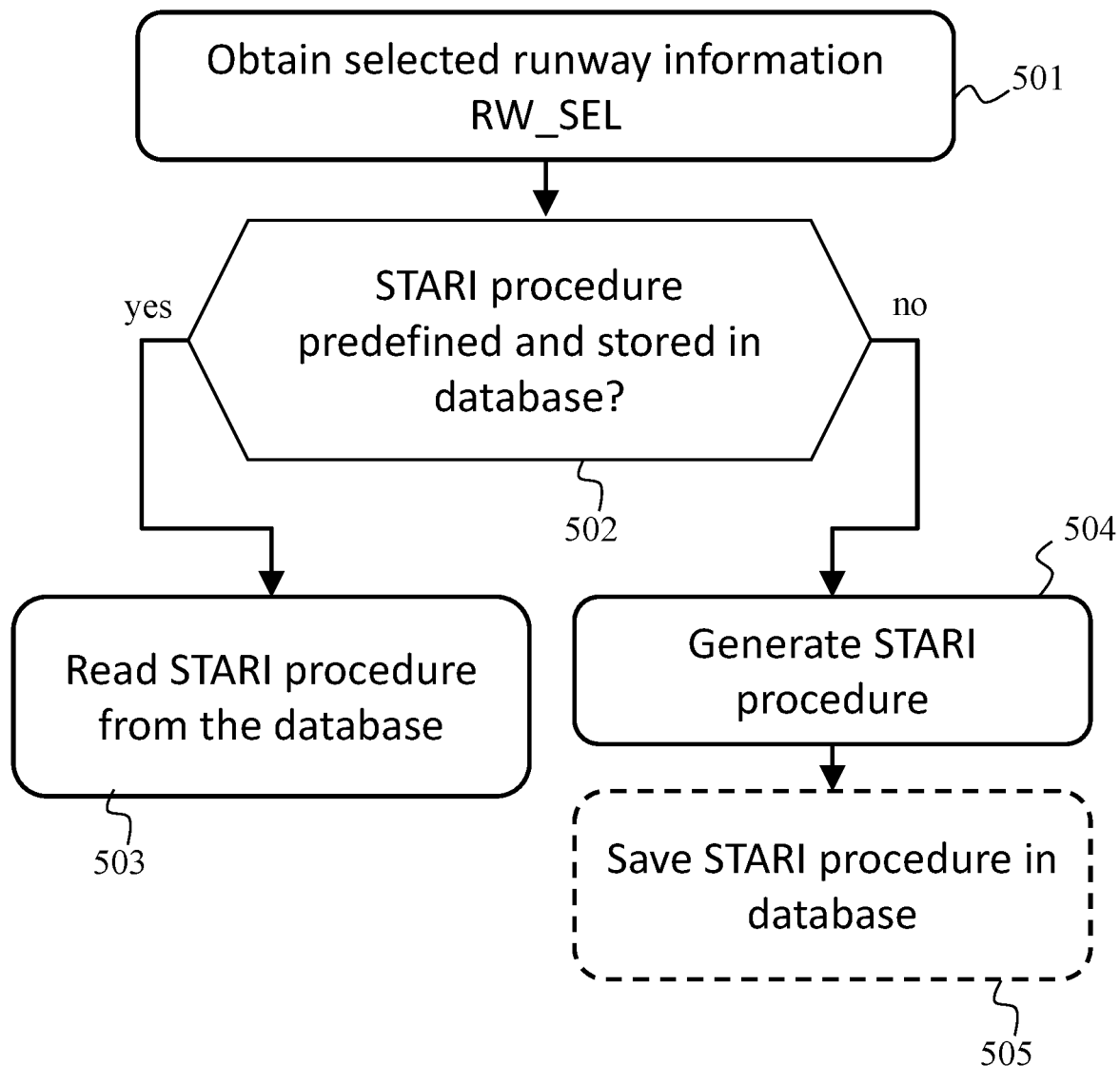
FIG. 5 schematically illustrates a STARI procedure obtainment algorithm implemented by the automatic trajectory generation system.

FIG. 5 schematically illustrates a STARI procedure obtainment algorithm implemented by the ATG system 101.

The algorithm of FIG. 5 is implemented when the database STARI DB 205 is available to the ATG system 101.

In a step 501, the ATG system 101 obtains the selected runway information RW_SEL.

In a step 502, the ATG system 101 checks with the database STARI DB 205 whether a STARI procedure has been defined beforehand for the selected runway RW_SEL and has been stored in the database STARI DB 205. If this is the case, a step 503 is performed; if not, a step 504 is performed.

In step 503, the ATG system 101 reads the STARI procedure from the database STARI DB 205. The ATG system 101 thus obtains the entry point SEP of the STARI procedure in question, in order to ascertain the geographical location and the minimum altitude at which the lateral trajectory to be computed should end. The ATG system 101 also obtains the applicable holding loop pattern, along with a final approach trajectory to be applied from the entry point SEP of the STARI procedure in order to land on the runway in question.

In step 504, given that no STARI procedure exists for the selected runway, the ATG system 101 generates a STARI procedure able to be applied for this runway. This aspect is described below with reference to FIG. 6.

In an optional step 505, the ATG system 101 saves the STARI procedure generated in step 504 in the database STARI DB 205, so that it is able to be reused subsequently by the aircraft 100, or another aircraft, to land on the runway in question.

Figure 6:
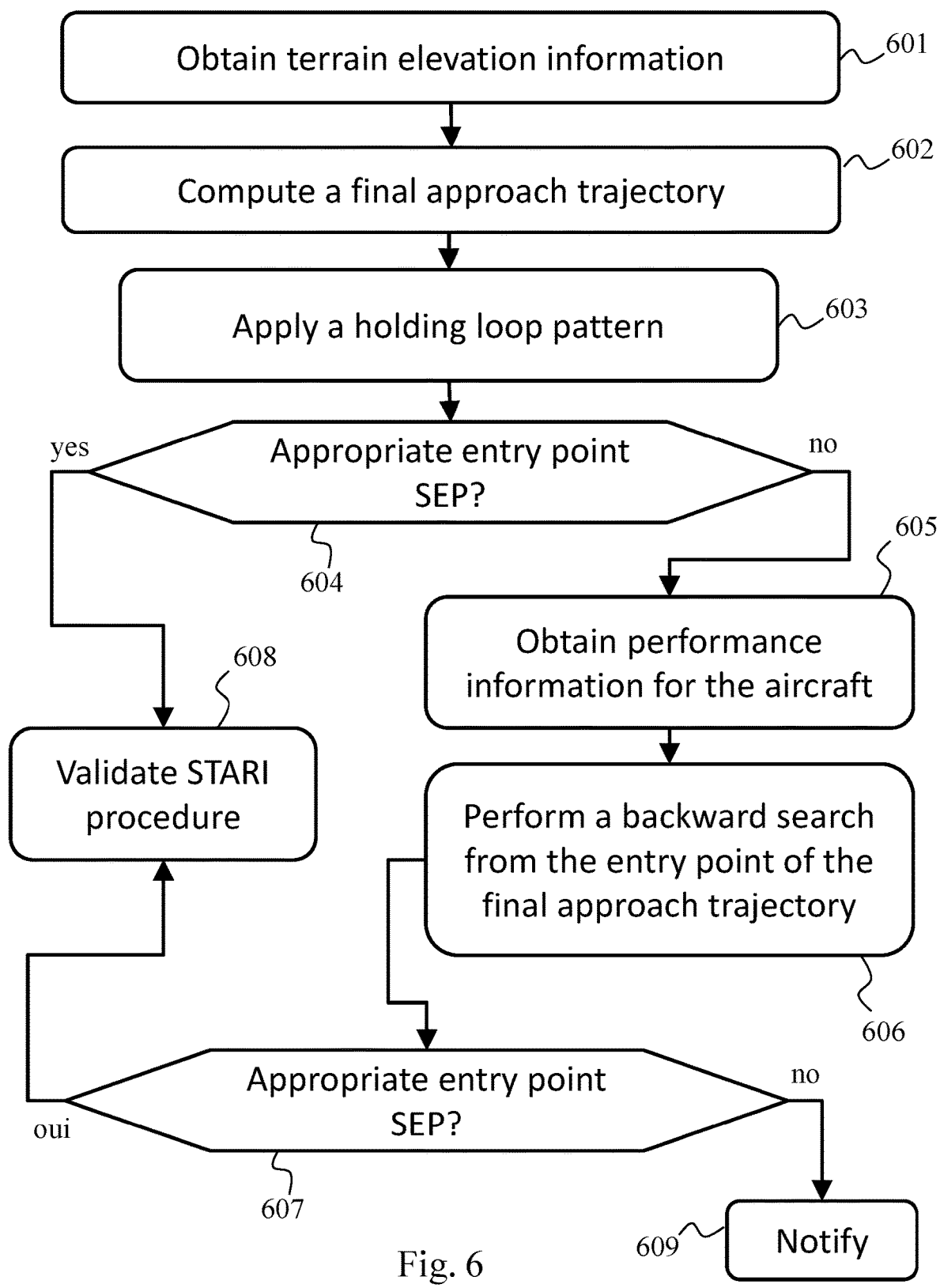
FIG. 6 schematically illustrates a STARI procedure generation algorithm implemented by the automatic trajectory generation system.

FIG. 6 schematically illustrates a STARI procedure generation algorithm implemented by the ATG system 101. The algorithm of FIG. 6 is implemented when the database STARI DB 205 is not available to the ATG system 101, or when the database STARI DB 205 does not yet contain any STARI procedure for the selected runway RW-SEL.

The generation of a STARI procedure is divided into two portions:
1. Constructing a final approach trajectory;
2. Searching for an appropriate entry point SEP of the STARI procedure.

An appropriate entry point SEP of the STARI procedure is such that:
   A flyable trajectory to an entry point of the constructed final approach trajectory exists;
   A safe holding loop pattern with a predefined shape from the entry point SEP exists to dissipate energy.

Thus, in a step 601, the ATG system 101 obtains, from the database DTDB 201, information about the elevation of the terrain surrounding the selected runway RW_SEL. Typically, the ATG system 101 obtains the terrain elevation information within a predetermined perimeter around the selected runway RW_SEL or of the airport containing the runway.

In a step 602, the ATG system 101 computes a final approach trajectory. The ATG system 101 computes a final approach fix FAF, represented by the point A in FIG. 7.

Figure 7:
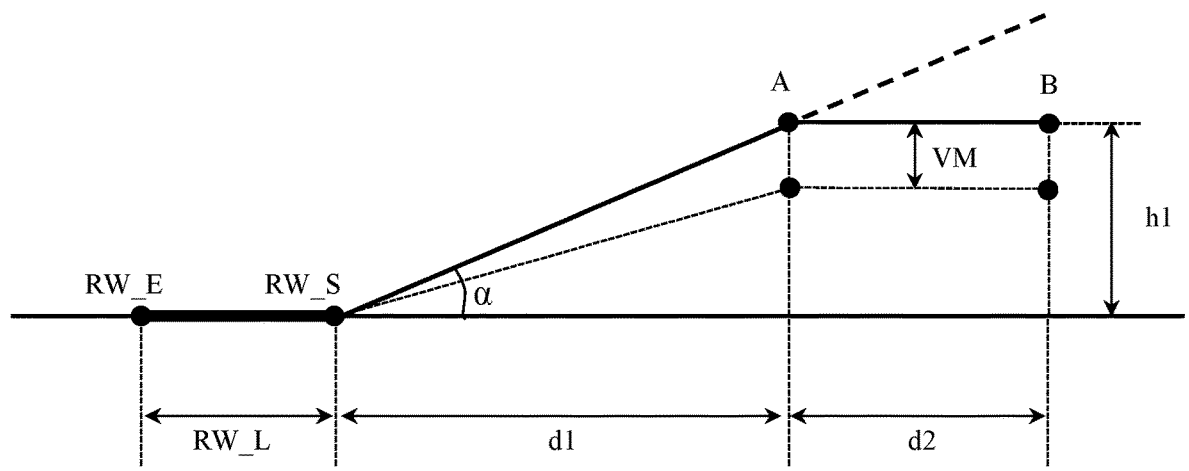
FIG. 7 schematically illustrates a side view of a landing final approach trajectory.

In FIG. 7, the start of the runway is represented by the point RW_S and the end of the runway is represented by the point RW_E. The runway has a length RW_L.

In order to be compatible with any landing system that is used, the ATG system 101 receives, at input, the angle α of the glide slope, and the intercept height h1 of the glide slope. The final approach fix FAF is thus easily computed through trigonometry, and is at a distance d1 from the start of the runway RW_S.

The ATG system 101 also receives, at input, a distance d2 that represents a distance before the final approach fix FAF at which the aircraft 100 should be aligned with the runway. It may be important to comply with this distance d2 in the case of landing assistance systems using image recognition, so as to allow correct interception with the glide slope. Alignment with the runway is then achieved at a point B, as shown in FIG. 7. Underneath the straight segment linking the point B to the point A, a vertical margin VM should be free of any terrain relief. This vertical margin decreases gradually from the point A to the start of the runway RW_S, as illustrated in FIG. 7.

The point B is then the entry point of the final approach trajectory.

The angle α, the height h1 and the distance d2 are contained in the selected runway information RW_SEL.

Figure 8:
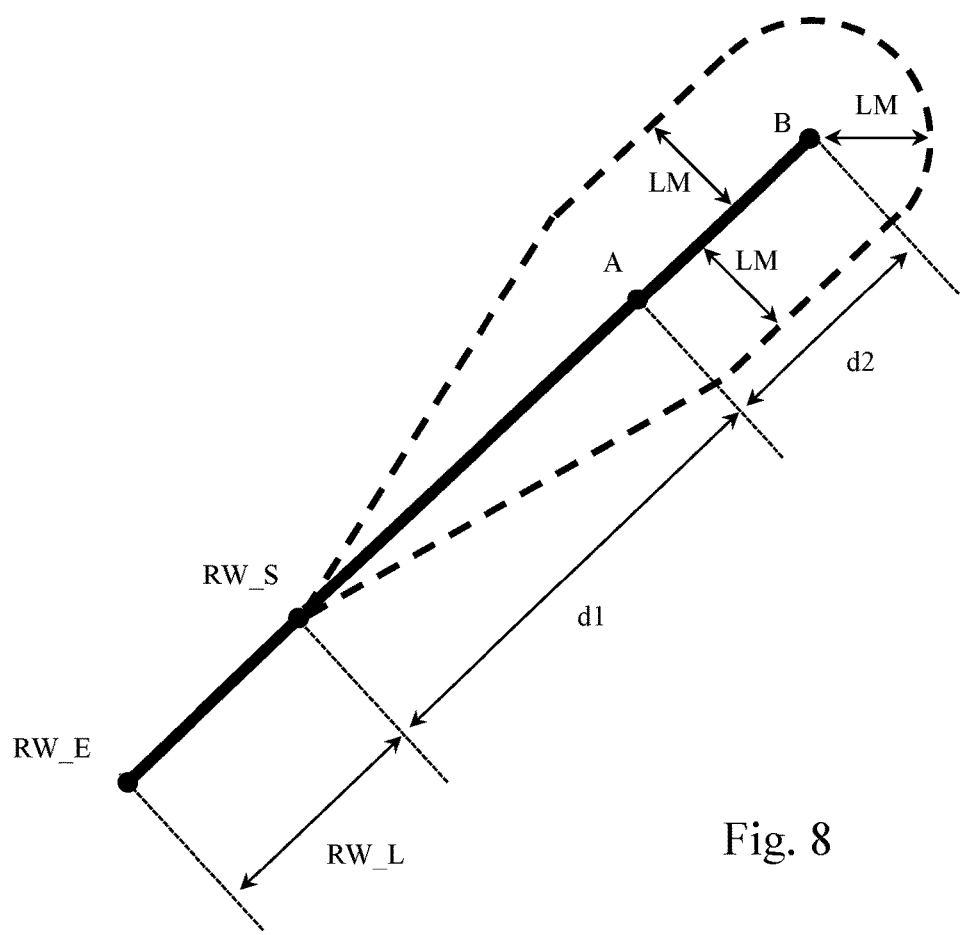
FIG. 8 schematically illustrates a top view of a landing final approach lateral trajectory.

A lateral margin LM should also be complied with laterally, as illustrated in FIG. 8. This lateral margin also decreases gradually from the point A to the start of the runway RW_S, as illustrated in FIG. 8.

The vertical margin VM and the lateral margin LM are predefined values that make it possible to ensure safety of instrument navigation, that is to say to ensure a safe, flyable trajectory.

Figure 9A:
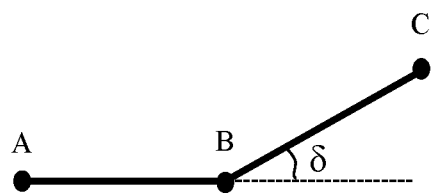
FIG. 9A schematically illustrates a side view of a landing final approach trajectory portion having a forced descent angle before alignment with a runway.
Figure 9B:
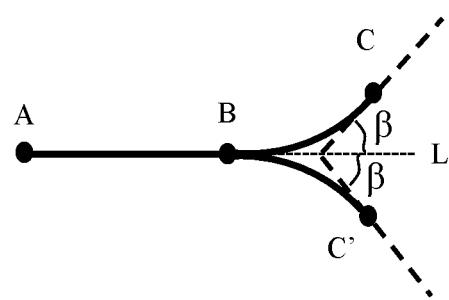
FIG. 9B schematically illustrates a top view of a landing final approach trajectory portion having a non-zero lateral approach angle before alignment with the runway.

It is furthermore possible to force a glide slope angle δ before the point B if necessary, as illustrated in FIG. 9A. It is also possible to force a lateral approach angle β to the right or to the left with respect to the axis of the runway L, as illustrated in FIG. 9B.

In this case, the point C is the entry point of the final approach trajectory.

Figure 10A:
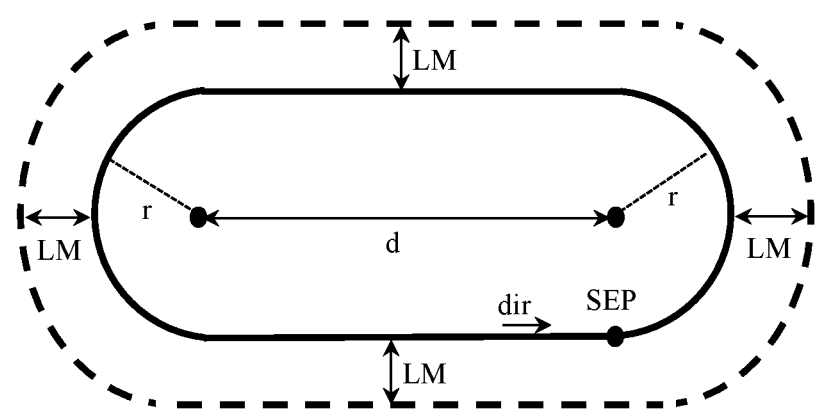
FIG. 10A schematically illustrates a top view of a holding loop pattern centered to the left.
Figure 10B:
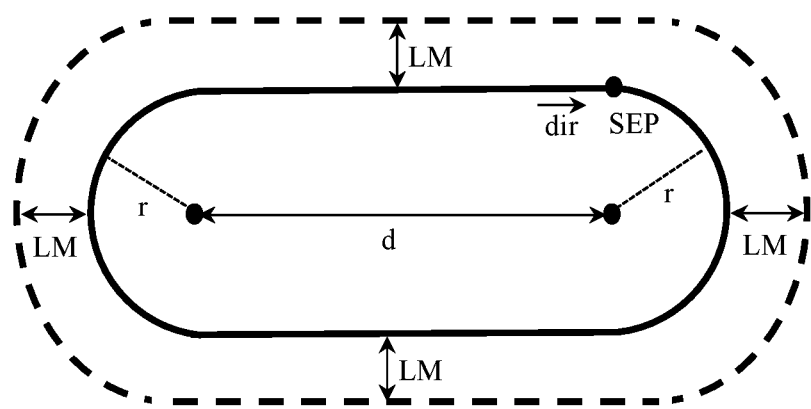
FIG. 10B schematically illustrates a top view of a holding loop pattern centered to the right.

Once the final approach has thus been constructed, a search for an entry point SEP of the STARI procedure may be undertaken. Thus, in a step 603, the ATG system 101 applies a holding loop pattern. The holding loop pattern has a predetermined oblong shape characterized by a radius r (the radius of the two semicircles at the ends) and a distance d (distance between the two semicircles), as illustrated in FIGS. 10A and 10B. FIG. 10A shows one implementation of the holding loop pattern with centering to the left and FIG. 10B shows one implementation of the holding loop pattern with centering to the right (the direction of travel of the aircraft is indicated by the arrow denoted "dir" in FIGS. 10A and 10B. The position of the entry point SEP of the STARI procedure is predefined on the holding loop pattern. In this case too, the lateral margin LM and the vertical margin VM should be free of any terrain relief. The holding loop pattern may be taken at a constant altitude by the aircraft 100, or while descending.

The radius r and the distance d are predetermined. Preferably, the radius r and possibly the distance d are set depending on the performance of the aircraft 100 as defined in the database PDB 203.

Figure 10C:
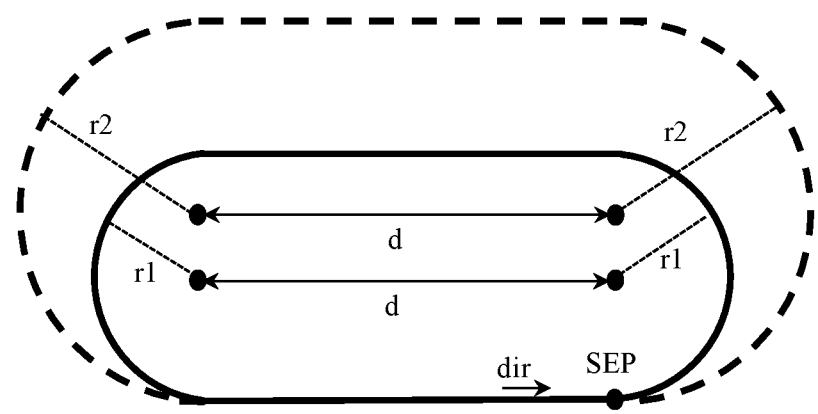
FIG. 10C schematically illustrates a top view of a holding loop pattern centered to the left, in one particular embodiment in which the holding loop pattern depends on the altitude at which it is applied.
Figure 10D:
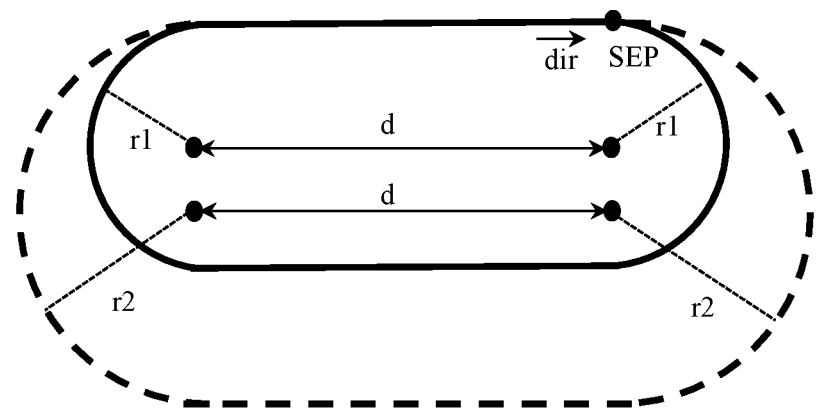
FIG. 10D schematically illustrates a top view of a holding loop pattern centered to the right, in one particular embodiment in which the holding loop pattern depends on the altitude at which it is applied.

In one particular embodiment, the radius r varies depending on the altitude of the aircraft 100. For example, the radius r varies in altitude section steps. The more the altitude increases, the greater the radius r. The higher the aircraft 100 gets above the entry point SEP of the STARI procedure, the faster the aircraft 100 gets, and therefore the larger the radius of a turn that it is capable of performing. The holding loop pattern keeps its shape, but its proportions change depending on the altitude, as illustrated in FIG. 10C, in which the holding pattern with two separate altitudes is shown centered to the left, and in FIG. 10D, in which the holding pattern with two separate altitudes is shown centered to the right. It should be noted that the margin LM is not shown in FIGS. 10C and 10D only for the sake of legibility. Thus, the holding loop pattern is characterized by a radius r=r1 at an altitude A1 and the holding loop pattern is characterized by a radius r=r2>r1 at an altitude A2>A1. The holding loop patterns keep the same distance d.

Figure 10E:
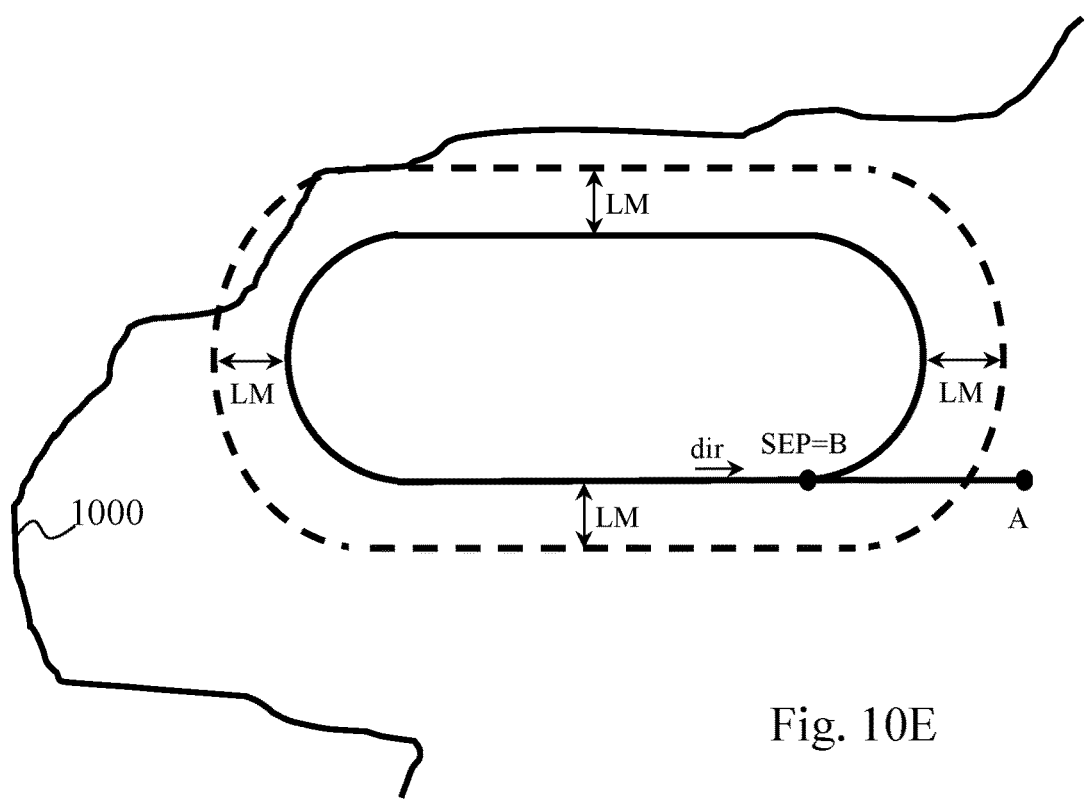
FIG. 10E shows one implementation of the holding loop pattern centered to the left, which is not flyable in light of a relief of the terrain in the vicinity of the runway.
Figure 10F:
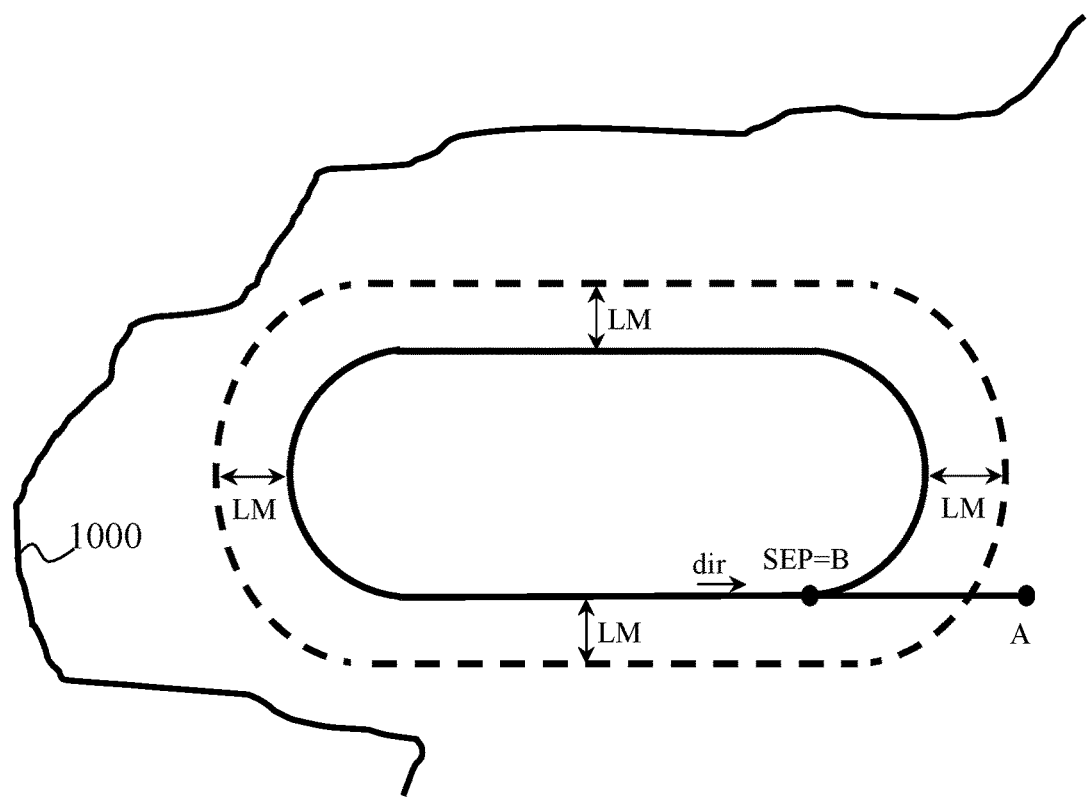
FIG. 10F shows one implementation of the holding loop pattern centered to the left, which is flyable in light of a relief of the terrain in the vicinity of the runway.

In the course of step 603, the ATG system 101 uses the flat holding loop pattern, that is to say, the one with a constant altitude. The ATG system 101 evaluates whether it is safe to implement the holding loop pattern, based on the terrain elevation information obtained in step 601, by placing the entry point SEP of the STARI procedure on the entry point of the final approach trajectory as obtained at the end of step 602. The ATG system 101 aligns the holding loop pattern with the final approach trajectory computed in step 602 (as illustrated in FIGS. 10E and 10F) and checks whether the holding loop pattern is able to be implemented without a risk of colliding with the relief of the terrain 1000 at the altitude under consideration. FIG. 10E shows a top view of one implementation of the holding loop pattern centered to the left, which is not flyable in light of the relief of the terrain 1000 at the altitude under consideration. FIG. 10F shows a top view, in another terrain configuration, of one implementation of the holding loop pattern centered to the left, which is flyable in light of the relief of the terrain 1000 at the altitude under consideration. If the implementation of the holding loop pattern centered to the left or to the right is not flyable, then the ATG system 101 tests the implementation of the holding loop pattern centered on the other side.

In a step 604, the ATG system 101 checks whether applying the holding loop pattern in step 603 leads to an appropriate entry point SEP of the STARI procedure. If this is the case, the generation of the STARI procedure is ended and a step 608 is performed; if not, a step 605 is performed. In step 608, the ATG system 101 validates the STARI procedure whose entry point SEP is coincident with the entry point of the final approach trajectory as obtained at the end of step 602. This entry point SEP and any point above this entry point SEP are then valid terminating points for computing a lateral trajectory. The STARI procedure thus validated also includes the holding loop pattern the implementation of which was validated in step 603, so as to allow energy to be dissipated on the approach to the runway.

In step 605, the ATG system 101 obtains, from the database PDB 203, performance information for the aircraft 100.

In order to ensure that a flyable trajectory between the entry point SEP of the STARI procedure and the entry point of the final approach trajectory exists, the ATG system 101, in a step 606, performs a backward search from the entry point of the final approach trajectory as obtained at the end of step 602. The ATG system 101 explores multiple paths until finding an entry point SEP for which the implementation of the holding loop pattern is flyable.

Figure 12A:
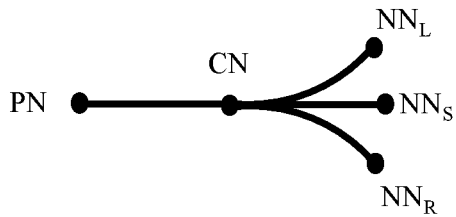
FIG. 12A schematically illustrates a top view of the possible trajectory extensions in a backward search, according to a first configuration.
Figure 12B:
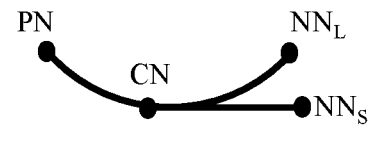
FIG. 12B schematically illustrates a top view of the possible trajectory extensions in a backward search, according to a second configuration.
Figure 12C:
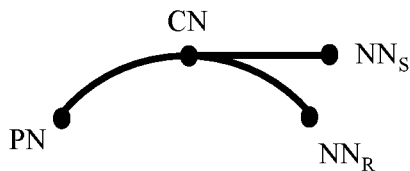
FIG. 12C schematically illustrates a top view of the possible trajectory extensions in a backward search, according to a third configuration.
Figure 13:
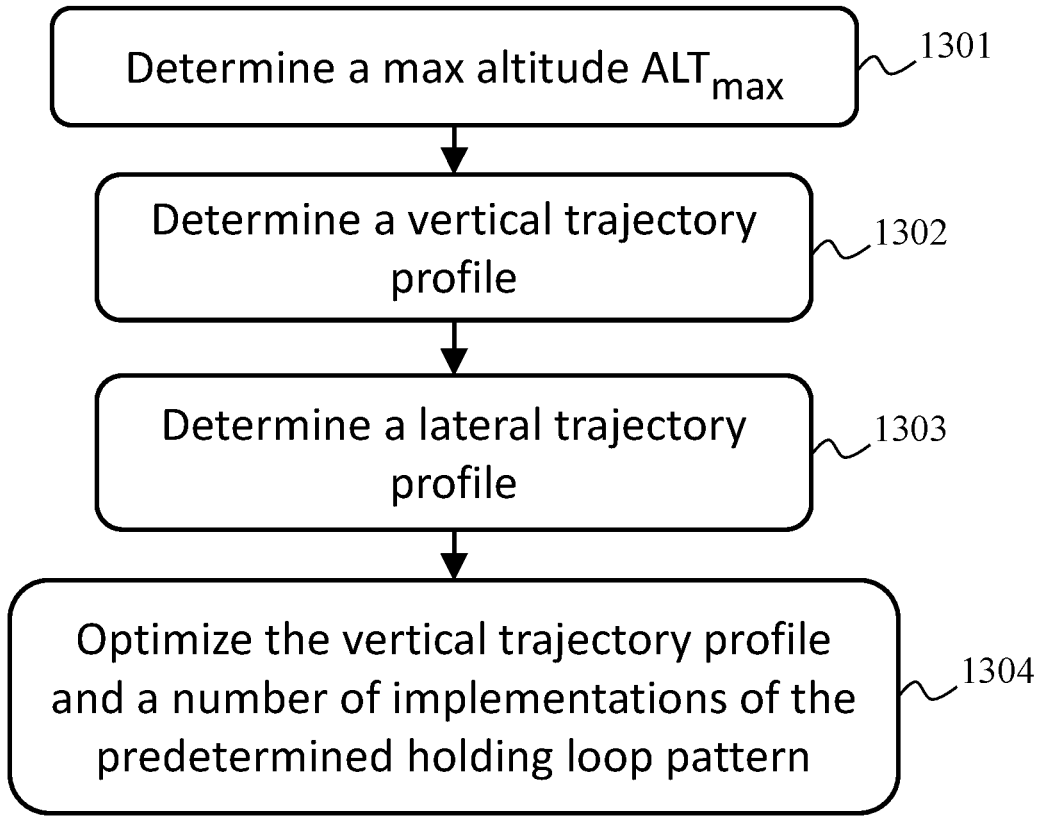
FIG. 13 schematically illustrates a lateral trajectory determination algorithm implemented by the automatic trajectory generation system.

In order for the trajectory to be able to be followed easily by the aircraft 100, the explored paths are formed of a sequence of turns (circular arcs) and/or straight segments only. The possible paths are explored considering a descent slope, a turn radius and speed performance of the aircraft 100 in line with the performance information obtained in step 605. The backward search is performed in trajectory sections whose length is predefined. Preferably, left and right turns cannot be concatenated without there being a straight line segment between them, as illustrated in FIGS. 12A to 12C.

The backward search is performed while applying a descent slope, thereby making the environment in which the holding loop pattern is tested less constrictive with regard to the terrain relief.

The backward search thus explores, in trajectory sections of a predefined length, paths formed of a sequence of turns and/or straight segments, considering a descent slope, a turn radius and a speed of the aircraft in line with the performance of the aircraft 100 as provided by the database PDB 203. Upon each new added section, the ATG system 101 evaluates whether it is safe to implement the holding loop pattern, based on the terrain elevation information, by placing the entry point SEP of the STARI procedure on the end of the explored path. The ATG system 101 considers the entry point SEP of the STARI procedure to be appropriate when it is safe to implement the holding loop pattern in light of the terrain elevation information. In the opposite case, the ATG system 101 extends the explored paths with new sections and re-evaluates the implementation of the holding loop pattern.

One particular embodiment of the backward search is described below with reference to FIG. 11.

In a step 607, the ATG system 101 checks whether the backward search has made it possible to find an appropriate entry point SEP of the STARI procedure. If this is the case, the generation of the STARI procedure is ended and step 608 is performed, in which the ATG system 101 validates the STARI procedure with the entry point SEP thus found; if not, a step 609 is performed.

In step 609, the ATG system 101 notifies that no STARI procedure was able to be defined in light of the performance of the aircraft 100. The ATG system 101 is therefore not able to find any flyable trajectory for landing the aircraft 100 on the selected runway. Another runway should then be selected. This may be used by a trajectory computing system, for example a flight management system FMS of the aircraft 100. Indeed, considering that such a trajectory computing system has access to a database comprising an ordered list of possible airports and runways, in order for example to land the aircraft 100 in an emergency following cabin depressurization, the trajectory computing system submits the runways to the ATG system 101 in the ordered list. If the ATG system 101 is capable of finding a flyable trajectory to the runway submitted by the trajectory computing system, then the trajectory is programmed into the trajectory computing system and is followed in order to land the aircraft 100. If not, the flight management system FMS submits the next runway in the ordered list to the ATG system 101.

Figure 11:
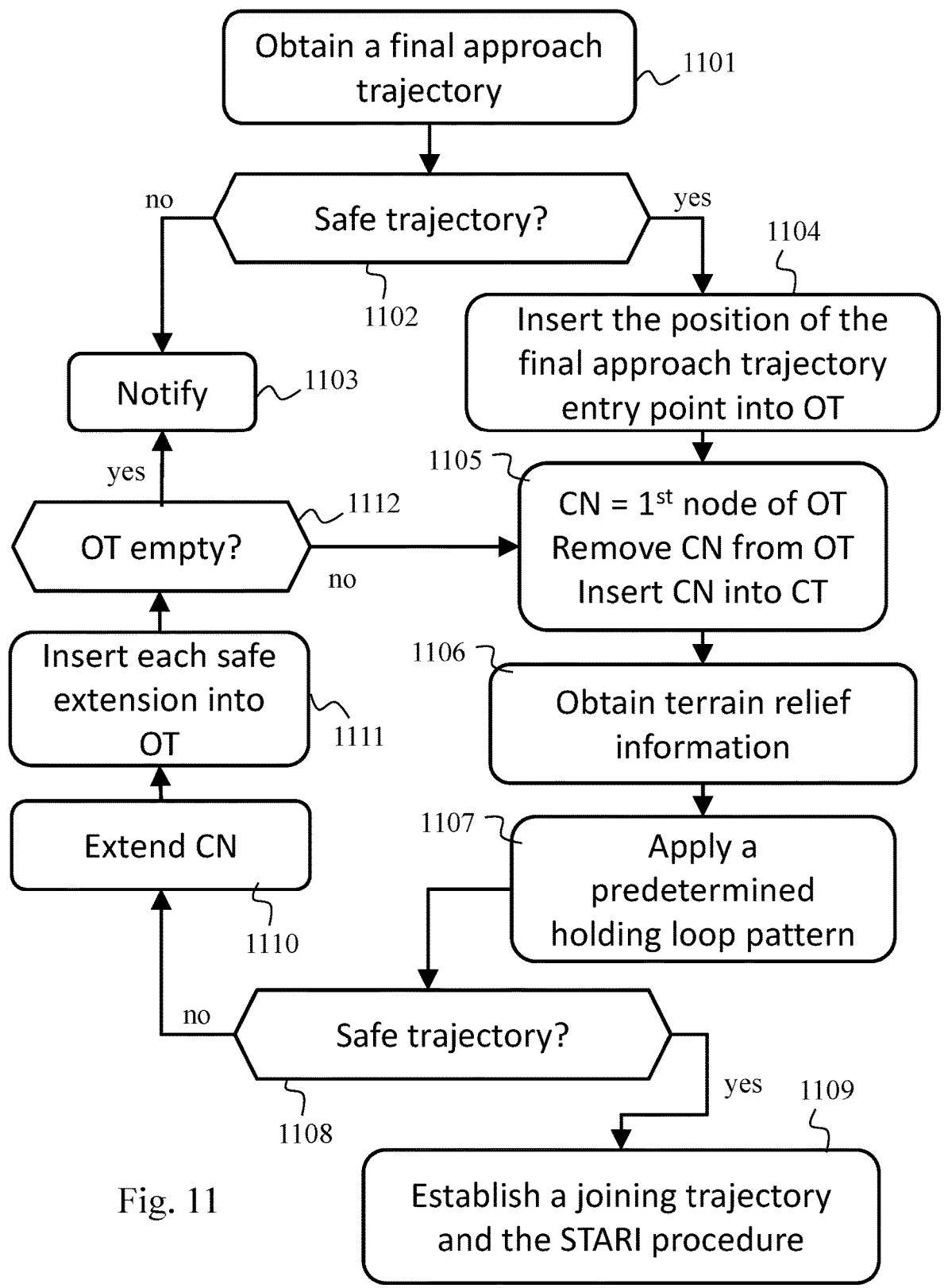
FIG. 11 schematically illustrates a STARI procedure generation algorithm implemented by the automatic trajectory generation system, in one particular embodiment.

FIG. 11 schematically illustrates a STARI procedure generation algorithm implemented by the ATG system 101, in one particular backward search embodiment.

In a step 1101, the ATG system 101 computes a final approach trajectory. Step 1101 is identical to step 602 described above.

In a step 1102, the ATG system 101 checks whether the final approach trajectory computed in step 1101 is a flyable trajectory. If this is the case, a step 1104 is performed; if not, a step 1103 is performed, in which the ATG system 101 notifies that no STARI procedure was able to be defined. Step 1103 is identical to step 609 described above.

In step 1104, the ATG system 101 inserts the position of the entry point of the final approach trajectory into a list OT ("open table"). The list OT is a list that contains active candidate trajectory points, that is to say those that are able to be chosen in upcoming iterations of the backward search in order to be explored further.

In a step 1105, the ATG system 101 places the most promising candidate from the list OT in a variable CN ("current node"), which is explored further during the current iteration of the backward search. To begin with, there is only the entry point of the final approach trajectory as candidate. The ATG system 101 removes this candidate from the list OT so that it is not chosen again in a following iteration of the backward search. The ATG system 101 additionally inserts the position pointed to by the variable CN into a list CT ("closed table"). The list CT contains paths that have been explored previously, and makes it possible to reconstruct the trajectory of the entry point SEP of the STARI procedure to the entry point of the final approach trajectory, provided that such an appropriate entry point SEP has been found.

In a step 1106, the ATG system 101 obtains, from the database DTDB 201, information about the relief of the terrain at the altitude under consideration for the position contained in the variable CN.

In a step 1107, the ATG system 101 applies the holding loop pattern, as in step 603 described above.

In a step 1108, the ATG system 101 checks whether applying the holding loop pattern in step 1107 leads to an appropriate entry point SEP of the STARI procedure. If this is the case, the backward search is ended and a step 1109 is performed; if not, a step 1110 is performed.

In step 1109, the ATG system 101 validates the STARI procedure whose entry point SEP is the point contained in the variable CN. The ATG system 101, using this list CT, reconstructs the trajectory that made it possible to obtain this point through a backward search from the entry point of the final approach trajectory as obtained at the end of step 1101, thereby giving a joining trajectory between this entry point SEP and the entry point of the final approach trajectory. The ATG system 101 adds this joining trajectory to the final approach trajectory, which is tantamount to extending the final approach trajectory.

In step 1110, the ATG system 101 extends the trajectory explored through a backward search, by applying a predetermined climb slope (due to the backward search) based on the performance of the aircraft 100 as provided by the database PDB 203.

The extensions that are theoretically possible are shown schematically in a top view in FIGS. 12A to 12C. In FIG. 12A, when the previous position PN ("previous node") on the backward search trajectory is linked to the current position CN currently being explored by a straight segment, the trajectory may be extended by a right turn and lead to a point NNR ("Next Node/Right"), or by a straight segment to lead to a point NNS ("Next Node/Straight"), or by a left turn and lead to a point NNL ("Next Node/Left"). In FIG. 12B, when the previous position PN on the backward search trajectory is linked to the current position CN currently being explored by a left turn, the trajectory may be extended by a left turn and lead to the point NNL, or by a straight segment to lead to the point NNS. The backward search thus preferably prevents a trajectory from being extended by a right turn in order to avoid a sequence of right and left turns without a straight segment between them. In FIG. 12C, when the previous position PN on the backward search trajectory is linked to the current position CN currently being explored by a right turn, the trajectory may be extended by a right turn and lead to the point NNR, or by a straight segment to lead to the point NNS. The backward search thus preferably prevents a trajectory from being extended by a left turn in order to avoid a sequence of right and left turns without a straight segment between them.

In step 1110, the ATG system 101 retains any possible extension only if it makes it possible to retain the vertical margin VM and the lateral margin LM mentioned above, that is to say any flyable extension, in light of the terrain elevation information obtained in step 1106. Thus, in a step 1111, the ATG system 101 inserts each flyable extension into the list OT for further exploration.

In a step 1112, the ATG system 101 checks whether the list OT is empty. If this is the case, step 1103 is performed; if not, step 1105 is reiterated in order to continue the exploration through the backward search.

Once the STARI procedure has been established, the ATG system 101 gets on with determining a flyable lateral trajectory that makes it possible to reach the entry point SEP of the STARI procedure or a point above it. In one particular embodiment, the ATG system 101 beforehand determines a vertical trajectory profile allowing the aircraft 100 to reach the maximum altitude ALTmax in light of the health information, denoted HLTH, as illustrated schematically in the algorithm of FIG. 13.

In a step 1301, the ATG system 101 determines the maximum altitude ALTmax in light of the health information HLTH and the performance of the aircraft 100. Indeed, the higher the aircraft 100 flies, the less constrictive the relief of the terrain for finding a flyable lateral trajectory from the position POS, and at the speed VEL, of the aircraft 100 to the entry point SEP of the STARI procedure (or a point above it).

Thus, in a step 1302, the ATG system 101 determines, from the position POS and the altitude ALT of the aircraft 100, the highest possible vertical trajectory profile based on the health information HLTH and the performance of the aircraft 100, that is to say in order to bring the aircraft 100 to the maximum altitude ALTmax.

Figure 14A:
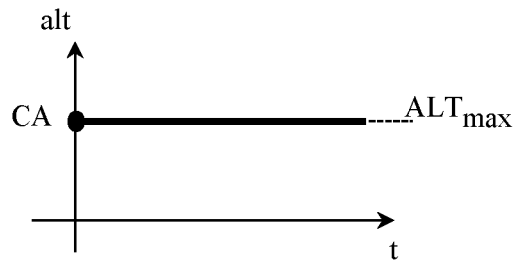
FIG. 14A schematically illustrates a first vertical trajectory profile.
Figure 14B:
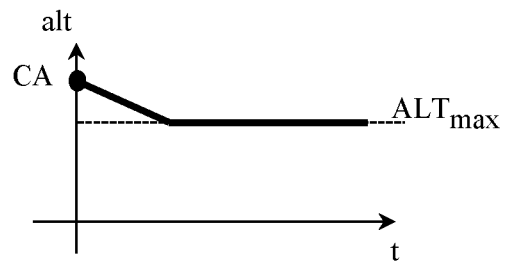
FIG. 14B schematically illustrates a second vertical trajectory profile.
Figure 14C:
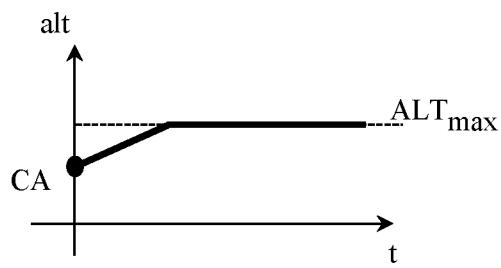
FIG. 14C schematically illustrates a third vertical trajectory profile.

If the current altitude CA of the aircraft 100 is equal to the maximum altitude ALTmax, no altitude change is made, as illustrated schematically in FIG. 14A, which shows a flat vertical trajectory profile over time t. If the current altitude CA of the aircraft 100 is higher than the maximum altitude ALTmax, the vertical trajectory profile descends in order to bring the aircraft to flying at the authorized maximum altitude ALTmax, as illustrated schematically in FIG. 14B. If the current altitude CA of the aircraft 100 is lower than the maximum altitude ALTmax, the vertical trajectory profile climbs in order to bring the aircraft to flying at the maximum altitude ALTmax and face a less constrictive environment (terrain relief), as illustrated schematically in FIG. 14C.

Figure 14D:
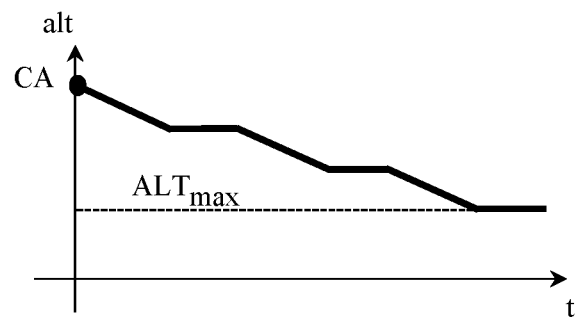
FIG. 14D schematically illustrates a fourth vertical trajectory profile.

If the maximum altitude ALTmax is lower than the current altitude CA of the aircraft 100 due to cabin depressurization, the vertical trajectory profile is computed based on cabin depressurization procedures and complies with a step-down descent, as illustrated schematically in FIG. 14D.

Next, in a step 1303, the ATG system 101 determines a flyable lateral trajectory that follows the vertical trajectory profile determined in step 1302. The ATG system 101 searches for a lateral trajectory that:

avoids the relief of the terrain, taking into account the lateral margin LM and the vertical margin VM, based on the terrain elevation information provided by the database DTDB 201 in accordance with the altitude defined by the vertical trajectory profile, the speed VEL and the performance of the aircraft 100 provided by the database PDB 203;

avoids military zones, taking into account the lateral margin LM and the vertical margin VM, based on the information provided by the database DMTDB 202 in accordance with the speed VEL and the performance of the aircraft 100 provided by the database PDB 203; and avoids weather obstacles in accordance with the altitude defined by the vertical trajectory profile, the speed VEL and the performance of the aircraft 100 provided by the database WTDB 204.

Figure 15:
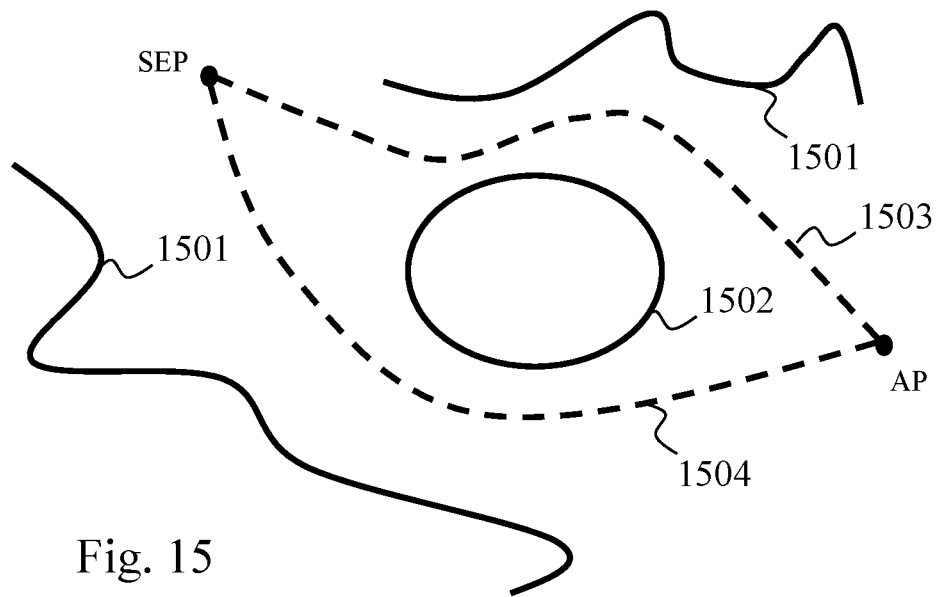
FIG. 15 schematically illustrates one example of a flyable lateral trajectory.

Many path search algorithms for avoiding obstacles are available in the literature, and this aspect will not be described in more detail here. Some examples of a flyable lateral trajectory are illustrated schematically in dashed lines in FIG. 15. Two flyable trajectories 1503 and 1504 are shown, from the current position AP ("aircraft position") of the aircraft 100 to the entry point SEP of the STARI procedure. The trajectories 1503, 1504 avoid the relief 1501 present at the flying altitude of the aircraft 100 in accordance with the vertical trajectory profile determined in step 1302, while complying with the lateral margin LM and the vertical margin VM. In addition, the trajectories 1503, 1504 avoid a zone 1502 that may correspond to a military no-fly zone or to a weather obstacle.

If the ATG system 101 finds multiple suitable trajectories, the ATG system 101 selects the trajectory to be used by applying one or more predetermined selection criteria (for example, the shortest trajectory). In one variant, the ATG system 101 informs the flight management system FMS of the various trajectories that have been found and leaves the flight management system FMS, or another entity of the avionics, to decide on the trajectory to be followed.

Preferably, in a step 1304, the ATG system 101 optimizes the vertical trajectory profile in order to reduce the number of implementations of the predetermined holding loop pattern able to be applied to the STARI procedure. Indeed, the lateral trajectory is determined in accordance with the vertical trajectory profile determined in step 1302. According to this vertical trajectory profile, the aircraft 100 arrives at the entry point SEP of the STARI procedure at the altitude ALTmax, and therefore most likely above the entry point SEP. The aircraft 100 may dissipate energy and reduce its altitude through the predetermined holding loop pattern. However, it is also possible to reduce altitude gradually before arriving at the entry point SEP, by adapting the vertical trajectory profile, and thus reduce the number of implementations of the predetermined holding loop pattern. One particular embodiment is shown by the algorithm illustrated schematically in FIG. 16.

Figure 17:
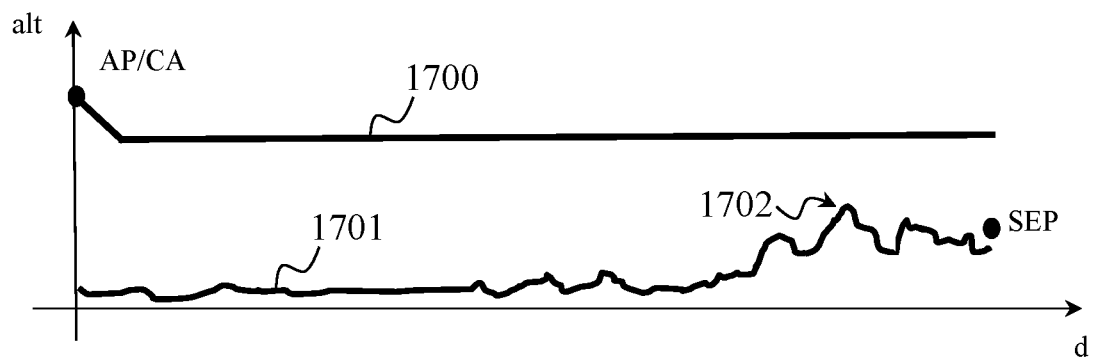
FIG. 17 schematically illustrates a terrain elevation profile along the determined lateral trajectory.

In a step 1601, the ATG system 101 obtains, from the database DTDB 201, a terrain elevation profile along the lateral trajectory determined in step 1303. Such a terrain elevation profile is illustrated schematically in FIG. 17. The vertical trajectory profile 1700 is shown schematically from the position AP and the current altitude CA of the aircraft 100 to a point above the entry point SEP of the STARI procedure. The terrain profile 1701 along the lateral trajectory has a culminating point 1702 at an altitude significantly lower than the maximum altitude ALTmax.

Figure 18:
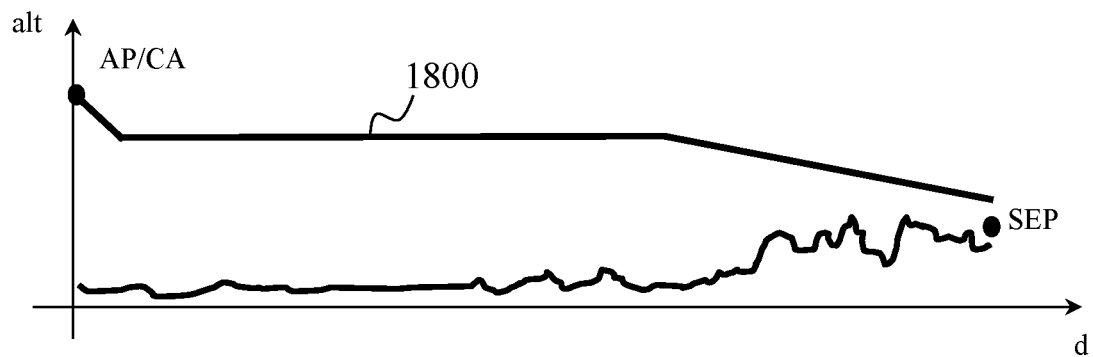
FIG. 18 schematically illustrates one example of an optimized vertical trajectory profile.

In a step 1602, the ATG system 101 determines a top of descent TOD and a corresponding descent trajectory to the entry point SEP of the STARI procedure. The top of descent TOD is the transition point from the cruising flight phase to the descent phase, and is commonly computed by flight management systems FMS on board aircraft. The top of descent TOD is thus determined while considering that the holding loop pattern is not implemented. If the top of descent TOD thus determined leads to a descent trajectory that remains flyable in light of the terrain relief, the optimization is ended. If not, the number of implementations of the holding loop pattern is incremented by one unit until the obtained descent trajectory is flyable (compliance with the vertical margin VM). One example of a descent trajectory thus obtained is illustrated schematically in FIG. 18.

Then, in a step 1603, the ATG system 101 determines a number of implementations of the holding loop pattern required for the vertical trajectory profile 1800 thus modified to be linked to the entry point SEP of the STARI procedure and, in a step 1604, the ATG system 101 adjusts the vertical trajectory profile accordingly.

Figure 19:
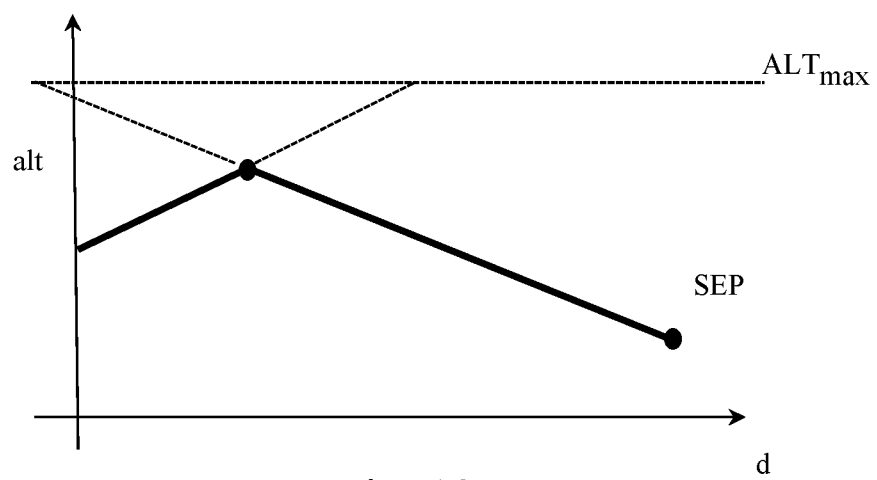
FIG. 19 schematically illustrates another example of an optimized vertical trajectory profile, when the top of descent occurs before the top of climb.

If the top of descent TOD occurs before the top of climb TOC when the aircraft 100 is climbing to attempt to reach the maximum altitude ALTmax, a particular optimization is performed, as illustrated schematically in FIG. 19. The top of climb TOC is the transition point from the climbing phase to the cruising flight phase. The vertical trajectory profile is then adjusted such that the aircraft 100 performs a transition between the climbing phase and the descent phase at the intersect of the climb and descent slopes. This intersect is determined easily through trigonometry.

In a step 1605, the ATG system 101 adjusts the overall trajectory following the optimization thus performed.

Figure 20:
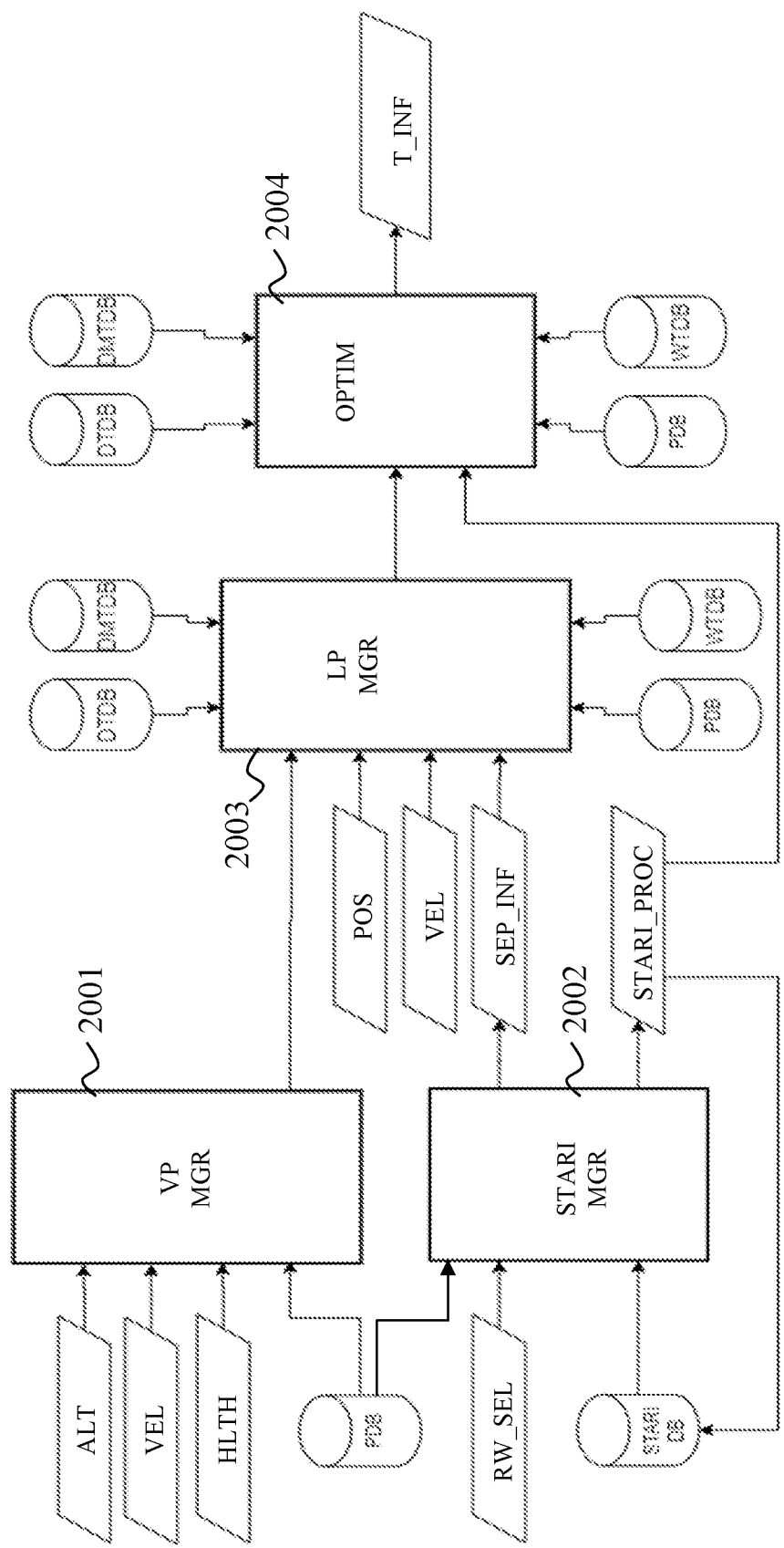
FIG. 20 schematically illustrates one particular embodiment of the automatic trajectory generation system.

FIG. 20 schematically illustrates one particular embodiment of the ATG system 101. In this particular embodiment, the ATG system 101 comprises a vertical profile manager 2001 (denoted VP MGR), a STARI procedure manager 2002 (denoted STARI MGR, for "STARI Manager"), a lateral profile manager 2003 (denoted LP MGR) and an optimizer 2004. The STARI procedure manager 2002 comprises electronic circuitry configured so as to implement the behavior described above with reference to FIGS. 5, 6, 7, 8, 10A, 10B, 10C, 10D, 10E and 10F, possibly with FIGS. 9A and 9B, and preferably with FIG. 11. The vertical profile manager 2001 comprises electronic circuitry configured so as to implement the method described above with reference to FIGS. 14A, 14B, 14C and 14D. The lateral profile manager 2003 comprises electronic circuitry configured so as to implement the behavior described above with reference to FIG. 15. And the optimizer 2004 comprises electronic circuitry configured so as to implement the behavior described above with reference to FIGS. 16, 17, 18 and 19.

The approach disclosed above is based on breaking down the computation of a trajectory into sub-problems that are less complex than seeking to directly determine an overall trajectory to land the aircraft 100. The processing time to achieve a flyable trajectory is significantly reduced.

In one particular embodiment, the electronic circuitry of the avionics of the aircraft 100 is configured so as to select a georeferenced runway and order the ATG system 101 to generate a flyable trajectory for reaching the selected georeferenced runway. If the ATG system 101 is incapable of generating such a trajectory, another georeferenced runway is selected until a runway is found for which the ATG system 101 manages to generate such a trajectory.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A trajectory generation method for generating a trajectory for bringing an aircraft in flight from a current position to a georeferenced runway, the method being implemented by an automatic trajectory generation system formed of electronic circuitry on board the aircraft, the method comprising:

obtaining a procedure, called a STARI procedure, which is suited to the georeferenced runway and which provides a final trajectory for the approach to the runway that is flyable by the aircraft in order to land, regardless of a performance of the aircraft, and such that, from the entry point of the final trajectory or any point above it, a holding loop pattern of a predefined shape is flyable in order to dissipate energy if necessary;

computing a lateral trajectory, avoiding any terrain relief, meteorological obstacles and military no-fly zones, between the current position of the aircraft and the entry point or a point above it, based on performance adapted to an operational state of the aircraft;

providing an overall trajectory in order to bring the aircraft to landing on the runway, by linking the computed lateral trajectory and the final trajectory provided by the STARI procedure, including one or more iterations of the holding loop pattern if necessary;

wherein, for obtaining the STARI procedure, the method comprises:

when a STARI procedure has been defined beforehand for the runway and has been stored in a database, reading the STARI procedure from the database;

when the database does not store any STARI procedure for said runway, establishing the STARI procedure in real time as follows:

constructing a final approach trajectory; and searching for an appropriate entry point of the STARI procedure that complies with the following conditions:

a flyable trajectory to an entry point of the constructed final approach trajectory exists; and the holding loop pattern is safely flyable by the aircraft from said entry point of the STARI procedure in order to dissipate energy;

wherein, for searching for the appropriate entry point of the STARI procedure, the method comprises:

evaluating whether it is safe to implement the holding loop pattern, based on information about the elevation of the terrain surrounding the runway, by placing the entry point of the STARI procedure on the entry point of the final approach trajectory and by aligning the holding loop pattern with the final approach trajectory;

considering the entry point of the STARI procedure to be appropriate when it is safe to implement the holding loop pattern in light of the information about an elevation of the terrain surrounding the runway; and performing a backward search for an entry point of the STARI procedure, from the entry point of the final approach trajectory by applying a descent slope, when it is not safe to implement the holding loop pattern in light of the information about the elevation of the terrain surrounding the runway.

2. The method according to claim 1, wherein the backward search comprises:

exploring, in trajectory sections of a predefined length, paths formed of a sequence of turns and/or straight segments, considering a descent slope, a turn radius and a speed of the aircraft in line with the operational state of the aircraft;

evaluating whether it is safe to implement the holding loop pattern, based on the information about the elevation of the terrain surrounding the runway, by placing the entry point of the STARI procedure on an end of an explored path;

considering the entry point of the STARI procedure to be appropriate when it is safe to implement the holding loop pattern in light of the information about the elevation of the terrain surrounding the runway, and establishing a joining trajectory between said appropriate entry point of the STARI procedure and the entry of the final approach trajectory; and extending the explored paths with new sections and re-evaluating an implementation of the holding loop pattern when it is not safe to implement the holding loop pattern in light of the information about the elevation of the terrain surrounding the runway.

3. The method according to claim 1, wherein the holding loop pattern has a predetermined oblong shape characterized by a radius r, which is the radius of two semicircles at the ends, and a distance d, which is the distance between the two semicircles, and wherein the radius r is defined based on performance adapted to the operational state of the aircraft and increases with altitude.

4. The method according to claim 1, comprising, before computing the lateral trajectory:

determining a maximum altitude with regard to the performance adapted to the operational state of the aircraft;

determining a vertical trajectory profile that brings the aircraft to the maximum altitude; and wherein the lateral trajectory is computed while following the determined vertical trajectory profile.

5. The method according to claim 4, wherein the vertical trajectory profile is optimized in order to reduce a number of implementations of the predetermined holding loop pattern able to be applied to the STARI procedure, through the following steps:

obtaining a terrain elevation profile along the lateral trajectory;

determining a top of descent and a corresponding descent trajectory to the entry point of the STARI procedure; and incrementing, if necessary, the number of implementations of the holding loop pattern by one unit until an obtained descent trajectory is flyable.

6. The method according to claim 5, wherein, if the top of descent occurs before a top of climb when the aircraft is climbing to attempt to reach the maximum altitude, the vertical trajectory profile is adjusted so that the aircraft performs a transition between a climbing phase and a descent phase at an intersect of the climb and descent slopes.

7. A non-transitory information storage medium storing instructions for implementing the method according to claim 1 when said instructions are read from the information storage medium and executed by a processor.

8. An automatic trajectory generation system for bringing an aircraft in flight from a current position to a georeferenced runway, said system comprising electronic circuitry configured so as to implement:

obtaining a procedure, called STARI procedure, which is suited to said georeferenced runway and which provides a final trajectory for the approach to said runway that is flyable by the aircraft in order to land, regardless of a performance of the aircraft, and such that, from an entry point of the final trajectory or any point above it, a holding loop pattern of a predefined shape is flyable in order to dissipate energy if necessary;

computing a lateral trajectory, avoiding any terrain relief, meteorological obstacles and military no-fly zones, between the current position of the aircraft and said entry point or a point above it, based on performance adapted to an operational state of the aircraft;

providing an overall trajectory in order to bring the aircraft to landing on said runway, by linking the computed lateral trajectory and the final trajectory provided by the STARI procedure, including one or more iterations of the holding loop pattern if necessary.

9. An avionics incorporating an automatic trajectory generation system according to claim 8.

10. The avionics according to claim 9, comprising electronic circuitry configured to:

select a georeferenced runway;

order the automatic trajectory generation system to generate a flyable trajectory for reaching the georeferenced runway;

if the automatic trajectory generation system is incapable of generating such a trajectory, select another georeferenced runway until finding a runway for which the automatic trajectory generation system manages to generate such a trajectory.

11. The avionics according to claim 9, wherein the electronic circuitry is configured to program an autopilot in accordance with a flyable trajectory that is provided by the automatic trajectory generation system.

12. The avionics according to claim 10, wherein the electronic circuitry is configured to program an autopilot in accordance with a flyable trajectory that is provided by the automatic trajectory generation system.

13. An aircraft comprising the avionics according to claim 9.

* * * * *